April 17, 1962 B. BIGOT 3,030,180
MANUFACTURE OF SODIUM TRIPOLYPHOSPHATE
Filed Jan. 15, 1959
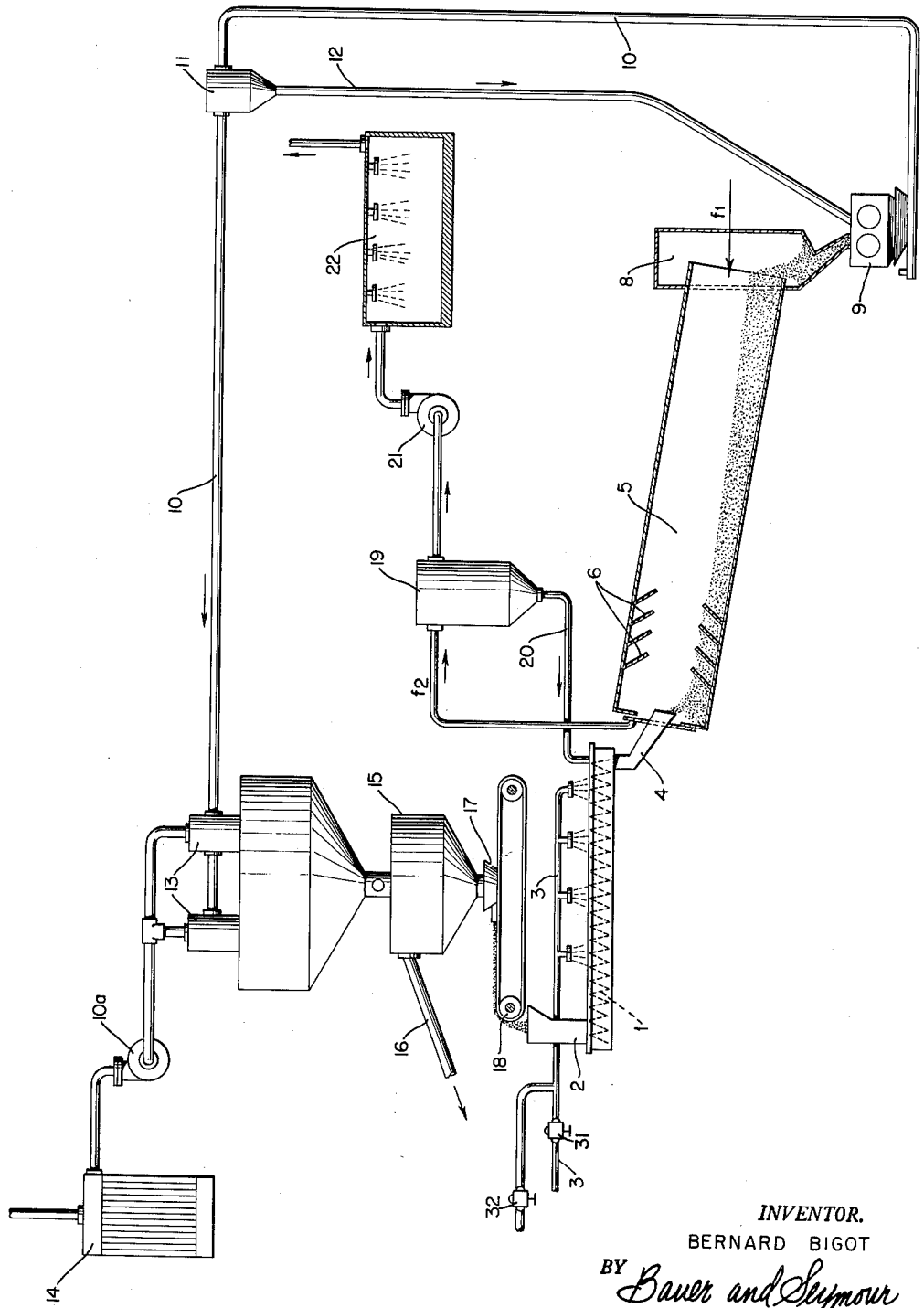
INVENTOR.
BERNARD BIGOT
BY Bauer and Seymour
ATTORNEYS

3,030,180
MANUFACTURE OF SODIUM TRIPOLY-PHOSPHATE
Bernard Bigot, Grand-Quevilly, France, assignor to Compagnie de Saint-Gobain, Paris, France
Filed Jan. 15, 1959, Ser. No. 787,070
Claims priority, application France Jan. 28, 1958
8 Claims. (Cl. 23—106)

Sodium tripolyphosphate may be prepared by evaporating a solution of mono and disodium orthophosphates followed by a calcination of the mixture of salts thus obtained. Such method, simple in principle, nevertheless presents a number of difficulties which arise on the one hand because of the complexity of the apparatus required and on the other hand because of the difficulty of regulating the temperature and the duration of the calcining operation. If the calcining is carried out at a temperature which is too low, or for a period of time which is too short, the transformation of the product to tripolyphosphate is incomplete, and the product contains insufficiently polymerized phosphates and/or undesired polymers. If, on the other hand, the calcining temperature is too high, the transformation of the product to tripolyphosphate is more complete but the product is in the form of a mixture of tripolyphosphates called, respectively, "Form I" and "Form II." Because Form I is only difficultly soluble in water, it and mixtures of it and Form II are considered undesirable by certain users or consumers.

In order to understand the following disclosure, it is well at this point to discuss the practical manner employed in the trade for determining the proportion of tripolyphosphate present as Form I which is present in an industrial tripolyphosphate which may contain both Forms I and II. Such analysis is made by a test which is called "Temperature Rise Test," which is abbreviated to T.R.T., which is based upon the measurement of the heat of dissolution of the part tripolyphosphate being analyzed. The empirical formula employed in such tests is:

Percentage by weight of Form I=4 (T.R.T.−6)

which readily permits the calculation of the percent by weight of Form I in the product being analyzed. It will be seen that, applying the above formula to sodium tripolyphosphate which is wholly in Form II, that is to say, which contains 0% of Form I, such sodium tripolyphosphate will have a T.R.T.=6. In practice, because of impurities contained in industrial sodium tripolyphosphate and because difficulties of analysis do not permit an absolute accuracy of measurement, it is not abnormal to obtain values of somewhat less than 6 for the T.R.T. of pure Form II sodium tripolyphosphate. Typical values thus obtained may be, for example, 5.7 or 5.8. Even though in theory such values less than 6 are impossible, when they are obtained it can reasonably be concluded that the product being analyzed is wholly in Form II.

The present invention relates to a simplified method for making sodium tripolyphosphate by calcining mono and disodium orthophosphates, and results in an improved product.

The method of the present invention consists in mixing the starting solution of mono and disodium orthophosphates with a part of the final product, that is to say the tripolyphosphate previously produced, and to introduce the resulting mixture in a continuous manner into calcining apparatus such as a rotary kiln heated to the appropriate temperature. By reason of such procedure, the evaporation of the orthophosphates and the transformation of the orthophosphates to tripolyphosphates is carried out in a single piece of apparatus, and the heat content of the gas employed to heat the material in such apparatus is utilized to its maximum.

The method in accordance with the invention results in a large reduction of the expense necessary for the apparatus required and for its operation. In addition, it has the advantage of giving a product of improved quality. The repeated passage of the tripolyphosphate through the calcining zone of the apparatus eliminates organic material therefrom, thus allowing the production of a whiter product. In addition, the process increases the proportion of orthophosphates which are transformed to tripolyphosphates, proportions of 97–98% tripolyphosphates in the final product being easily attained. Finally, as will be explained hereinafter, because of the repeated calcination of the product already made, in the presence of water, the method improves the transformation of tripolyphosphate in Form I to tripolyphosphate in Form II. Thus, any tripolyphosphate in Form I which may have been accidentally produced as, for example, by local overheating of the product will very largely be changed to tripolyphosphates in Form II.

The mixture of recycled solid product in the solution of orthophosphates employed is preferably that containing the largest proportion of solution compatible with obtaining a mixture having a consistency such as to permit it to travel readily in the calcinator. In practice, with the usual concentration of solutions of orthophosphates, such proportion may advantageously correspond to 20 parts by weight $P_2O_5$ contained in the solution to 100 parts by weight of $P_2O_5$ contained in the recycled product.

The mixture of solution and solid product is preferably circulated in the calcinator in counter-current to the heating gas, so as automatically to produce the drying of the moist product by the still heated gas as it leaves the zone of calcination. The final product leaving the calcinator, after appropriate conditioning, is separated into two parts, one representing production and being sent to storage, and the other being recycled to the head of the system where it is mixed with a solution of orthophosphates being introduced therein.

In the drawing, which accompanies and forms a part of the specification, the sole FIGURE is a somewhat diagrammatic view of a preferred embodiment of apparatus employed in carrying out the method of the invention.

Turning now to the drawing, the reference character 1 designates a mixer, which is preferably made of noncorrodible alloy, such as stainless steel. The portion of the final product to be recirculated is deposited in mixer 1 through hopper 2, and is subjected in the mixer to the aforesaid solution of orthophosphates which is introduced into the mixture through distributor 3. At the exit end of the mixer the resulting mixture of the final product and orthophosphate solution is discharged through a funnel member 4 into a combined dryer and calcinator 5. Apparatus 5 is in the form of a rotary cylinder somewhat inclined to the horizontal so that the entrance end lies above the exit end thereof. Apparatus 5 carries inwardly thereof, adjacent its upper entrance end, vanes or palettes 6 which break up the mixture introduced therein so as continually to renew the surface of the mixture exposed to the heated gas passing through the apparatus 5.

The entrance end of apparatus 5 may be considered as the drying zone thereof. Below the vanes 6 the wall of the apparatus is smooth. Such smooth wall portion is the calcining zone. At the lower end of apparatus 5 the calcined mixture is discharged into a hopper 8 from which it passes to a crushing mill 9. The hopper 8 is provided with means, only diagrammatically indicated, whereby heated gas, designated by the arrow $f'$, may pass into the lower exit end of apparatus 5.

After discharge from crushing mill 9, the comminuted product is carried by a pneumatic conveyor 10 to a selector 11, the finer fraction of the material being forwarded to cyclones 13. The larger particles rejected by selector 11 are recycled to the crushing mill through conduit 12. Pneumatic conveyor 10 is powered by a suction blower 10a, which is located beyond the cyclones 13. The gas discharged by blower 10a is led through a suitable filter 14 before it is discharged to the atmosphere.

A portion of the material which reaches cyclones 13 is discharged therebelow through a conduit 16 from which it is led to storage. The remainder of such product is led to hopper 15 from which it is discharged through a funnel member 17 onto a driven conveyor 18. Such material is led through funnel member 2 to the mixer 1, where it meets the above described orthophosphate solution.

The heating gas ($f'$) after travelling through the dryer-calcinator 5 leaves the upper end of apparatus 5 through suitable means, such as a conduit not shown, in path $f^2$. Such still heated gas is led into a cyclone 19 where it is stripped of any solid particles entrained therein. Such solid particles are returned to the exit end of mixer 1 from cyclone 19 by suitable means designated by the line 20. The gas is sucked from cyclone 19 by a suction blower 21, being led through a gas washing apparatus 22 before it is discharged to the atmosphere, as through a stack.

There is set out below an example of the manufacture of sodium tripolyphosphate in accordance with the method of the invention wherein the above described apparatus is employed.

The concentrated starting orthophosphate liquor contains around 50% of dissolved solid matter and has a ratio $Na_2O/P_2O_5$ approximately equal to 1.67. Such liquor is mixed with 2.5 times its weight of re-cycled crushed tripolyphosphate. With such proportions of orthophosphate solution and a re-cycled product there is obtained a mixture of grains having a dry appearance and a diameter from 2 to 10 mm. Such grains are introduced continuously into the dryer-calcinator 5, in which the product is retained, in the described method, for from about one hour to 1½ hours. The temperature of the heating gas in the entrance end of the dryer calcinator 5 is such that the temperature of the calcining zone is held between 300° and 450° C. The temperature of the gas leaving the calcinator is controlled by the admission of secondary air the rate of admission of which is controlled by blower 21. The temperature of the gas leaving apparatus 5 is in general between 100° and 140° C.

At the exit end of the calcinator, the product, which is then at a temperature of about 100° C., is subjected to the air in pneumatic conveyor 10, which is at ambient temperature. The final product is thus generally at a temperature of 100° C. when it is discharged to storage through conduit 16 and is discharged for re-circulation, onto the conveyor 18. In general, for each part by weight of the product forwarded to storage, five parts by weight of the product are re-cycled onto conveyor 18.

Prior to the present invention it was the general belief in the art that the repeated calcination of tripolyphosphate under the above conditions as to temperature and the length of time of calcination would tend to increase the proportion of tripolyphosphate in Form I and would consequently decrease the content of such material in Form II.

Contrary to such belief, however, research by the present inventor has proved that tripolyphosphate passes into Form II or retains such form if, before each new calcination, the product is additionally moistened, with pure water or with an aqueous solution, preferably an aqueous solution of sodium phosphates. As shown in the drawing, valve 32 may be used to admit pure water to pipe 3, and valve 31 may be used to admit the aqueous solution to moisten the dry, recycled product supplied by system 10—13—15. The results obtained by the method of the present invention are well illustrated by experiments in which different portions of sodium tripolyphosphate were subjected in a cycle of five successive calcining operations, the product being moistened at each calcining operation with 20 parts of $P_2O_5$ in the form of a solution of mono- and di-sodium orthophosphates for 100 parts of $P_2O_5$ contained in the product. After each calcination, ⅙ of the calcined product was subtracted, in order to eliminate a quantity of tripolyphosphate corresponding to the $P_2O_5$ added to the product by its treatment with the solution.

At the end of each calcination the T.R.T. of the product was measured. The results of each of the five successive calcinations appear in the last five columns, designated 1–5, respectively, in the table below.

| T.R.T. of starting sample | Temperature of each calcination, °C. | Duration of each calcination | T.R.T. after each Calcination | | | | |
|---|---|---|---|---|---|---|---|
| | | | 1 | 2 | 3 | 4 | 5 |
| 8.7 | 400 | 1 h. 30 min. | 5.5 | 5.8 | 5 | 5.6 | 5.2 |
| 15.2 | 425 | 45 min | 6.6 | 6.1 | 5.7 | 5.5 | 5.3 |
| 15.2 | 450 | 30 min | 7.3 | 5.8 | 5.9 | 5.6 | 5.7 |
| 15.2 | 475 | 20 min | 8 | 6.4 | 6 | 6.5 | 6 |
| 15.2 | 500 | 15 min | 8.2 | 8.2 | 6.2 | 6.4 | 6 |

It is to be observed that the T.R.T. of the product is lowered in all cases to the neighborhood of 6, that is, corresponding to tripolyphosphate in pure Form II even though the starting material has a high T.R.T. It should also be observed that in the final product a value of approximately 6 for the T.R.T. is maintained in spite of the repeated calcining operations.

As many apparently widely different embodiments of the present invention may be met without departing from the spirit and scope thereof, it is to be understood that the invention is not limited to the specific embodiment thereof described.

What is claimed is:

1. The continuous method of making alkali metal tripolyphosphates of substantially pure Form II which consists of mixing a solution of mono- and di-alkali metal orthophosphate with previously formed tripolyphosphate, passing the mixture as a stream through a calcining zone having a calcining temperature between about 300 and 450° C. and a discharge temperature not substantially above 140° C., wetting the stream with an aqueous liquid from the class consisting of water and orthophosphate solution as it passes to the calcining zone, ending the wetting while the mixture has a consistency permitting it to travel readily in the calcining zone, recycling the stream through the wetting and calcining zones until it issues from the calcining zone as about 97–98% tripolyphosphate of substantially pure Form II, and continuously extracting a minor proportion of the finished product from the cycling stream and replacing it with an equivalent amount of orthophosphate, the orthophosphate being added to the stream at a place ahead of the wetting step.

2. The method of claim 1 in which the recycled material is wetted with water.

3. The method of claim 1 in which the recycled material is wetted with aqueous orthophosphate solution.

4. The method of claim 1 in which the rate of withdrawal of tripolyphosphate from the cycling system and the addition of orthophosphate are balanced at about ⅙ of the weight of the cycling mass.

5. The method of claim 1 in which the mixture of orthophosphates and recycled product contains about 20 parts by weight $P_2O_5$ in the orthophosphate solution and about 100 parts by weight of recycled product.

6. The method of claim 1 in which the alkali metal is sodium.

7. The method of claim 6 in which the orthophosphate liquor contains about 50% of dissolved solids having a ratio $Na_2O/P_2O_5$ of about 1.67 and is mixed with wetted, recycled, crushed tripolyphosphate at a weight ratio of 1:2.5.

8. The method of claim 7 in which the recycled product is wetted at a ratio of about 20 parts $P_2O_5$ as a solution of mono- and di-sodium orthophosphates for each 100 parts of $P_2O_5$ in the recycled product.

References Cited in the file of this patent

UNITED STATES PATENTS

| | | |
|---|---|---|
| 2,745,717 | Edwards | May 15, 1956 |
| 2,776,187 | Pfengle | Jan. 1, 1957 |
| 2,920,939 | Edwards | Jan. 12, 1960 |